US009824670B1

(12) United States Patent
Pahl et al.

(10) Patent No.: US 9,824,670 B1
(45) Date of Patent: Nov. 21, 2017

(54) MUSICAL INSTRUMENT ACTIVITY MONITORING SYSTEM

(71) Applicants: Shannon Pahl, Bellevue, WA (US); Earl Goedvolk, Imbabura (EC); Dawn Pahl, Imbabura (EC)

(72) Inventors: Shannon Pahl, Bellevue, WA (US); Earl Goedvolk, Imbabura (EC); Dawn Pahl, Imbabura (EC)

( * ) Notice: Subject to any disclaimer, the term of this patent is extended or adjusted under 35 U.S.C. 154(b) by 0 days.

(21) Appl. No.: 15/435,652

(22) Filed: Feb. 17, 2017

(51) Int. Cl.
G10H 1/00 (2006.01)
G10H 1/32 (2006.01)

(52) U.S. Cl.
CPC ............ G10H 1/0008 (2013.01); G10H 1/32 (2013.01); *G10H 2210/091* (2013.01); *G10H 2220/005* (2013.01); *G10H 2220/395* (2013.01); *G10H 2240/211* (2013.01)

(58) Field of Classification Search
CPC .. G10H 1/0008; G10H 1/32; G10H 2210/091; G10H 2220/005; G10H 2220/395; G10H 2240/211
USPC ........................................................ 84/644
See application file for complete search history.

(56) References Cited

U.S. PATENT DOCUMENTS 4,649,784 A 3/1987 Fulks
9,202,520 B1* 12/2015 Tang ...................... G11B 27/00
9,286,808 B1* 3/2016 Raley .................... G09B 15/003
9,620,095 B1* 4/2017 Hamilton ............... G10H 1/368
9,640,160 B2* 5/2017 Wang .................... G10H 1/0016
2013/0138716 A1 5/2013 Macwan
2014/0090547 A1* 4/2014 Udell, III ............. G10H 1/0091
84/626
2014/0123838 A1* 5/2014 D'Amours ............... G10H 1/32
84/626
2014/0260903 A1* 9/2014 Stok ..................... G09B 15/002
84/477 R
2015/0156567 A1* 6/2015 Oliver ...................... H04Q 9/00
340/870.07
2016/0180825 A1* 6/2016 Adachi ................ G10H 1/0083
700/94
2016/0335997 A1* 11/2016 White ..................... G10H 3/186
2017/0177091 A1* 6/2017 Shah ....................... G06F 3/017

* cited by examiner

Primary Examiner — Jeffrey Donels
(74) Attorney, Agent, or Firm — Mohr Intellectual Property Law Solutions, PC

(57) ABSTRACT

A musical instrument activity monitoring system having a tracking and monitoring assembly including a microcontroller with non-volatile memory, an accelerometer, at least one sensor, and an antenna each in communication with the microcontroller, a power source, and a coupler. In-use parameters of musical instrument activity is tracked and monitored by the tracking and monitoring assembly. The microcontroller with non-volatile memory stores data. The data relates to values and timestamps retrieved from use of the at least one musical instrument and environmental conditions at least one musical instrument is in to analyze performance of the at least one musical instrument.

17 Claims, 8 Drawing Sheets

MUSICAL INSTRUMENT ACTIVITY MONITORING SYSTEM

BACKGROUND

The present disclosure relates generally to activity monitoring devices. In particular, a musical instrument activity monitoring system is described.

Known activity monitoring devices are not entirely satisfactory for the range of applications in which they are employed. For example, existing activity monitoring devices do not provide musical instrument tracking.

Thus, there exists a need for activity monitoring devices that improve upon and advance the design of known activity monitoring devices. Examples of new and useful musical instrument activity monitoring system relevant to the needs existing in the field are discussed below.

Disclosure addressing one or more of the identified existing needs is provided in the detailed description below. Examples of references relevant to activity monitoring devices include U.S. Pat. No. 4,649,784 and 20130138716. The complete disclosures of the above patents and patent applications are herein incorporated by reference for all purposes.

SUMMARY

The present disclosure is directed to a musical instrument activity monitoring system having a tracking and monitoring assembly including a microcontroller with non-volatile memory, an accelerometer, at least one sensor, and an antenna (each in communication with the microcontroller), and a power source, and a coupler (coupling means). In-use parameters of a musical instrument activity is tracked and monitored by the tracking and monitoring assembly. The microcontroller with non-volatile memory stores data. The data relates to values and timestamps retrieved from use of the at least one musical instrument and the environmental conditions the at least one musical instrument is in to analyze performance of the at least one musical instrument.

DETAILED DESCRIPTION

Figure 1:
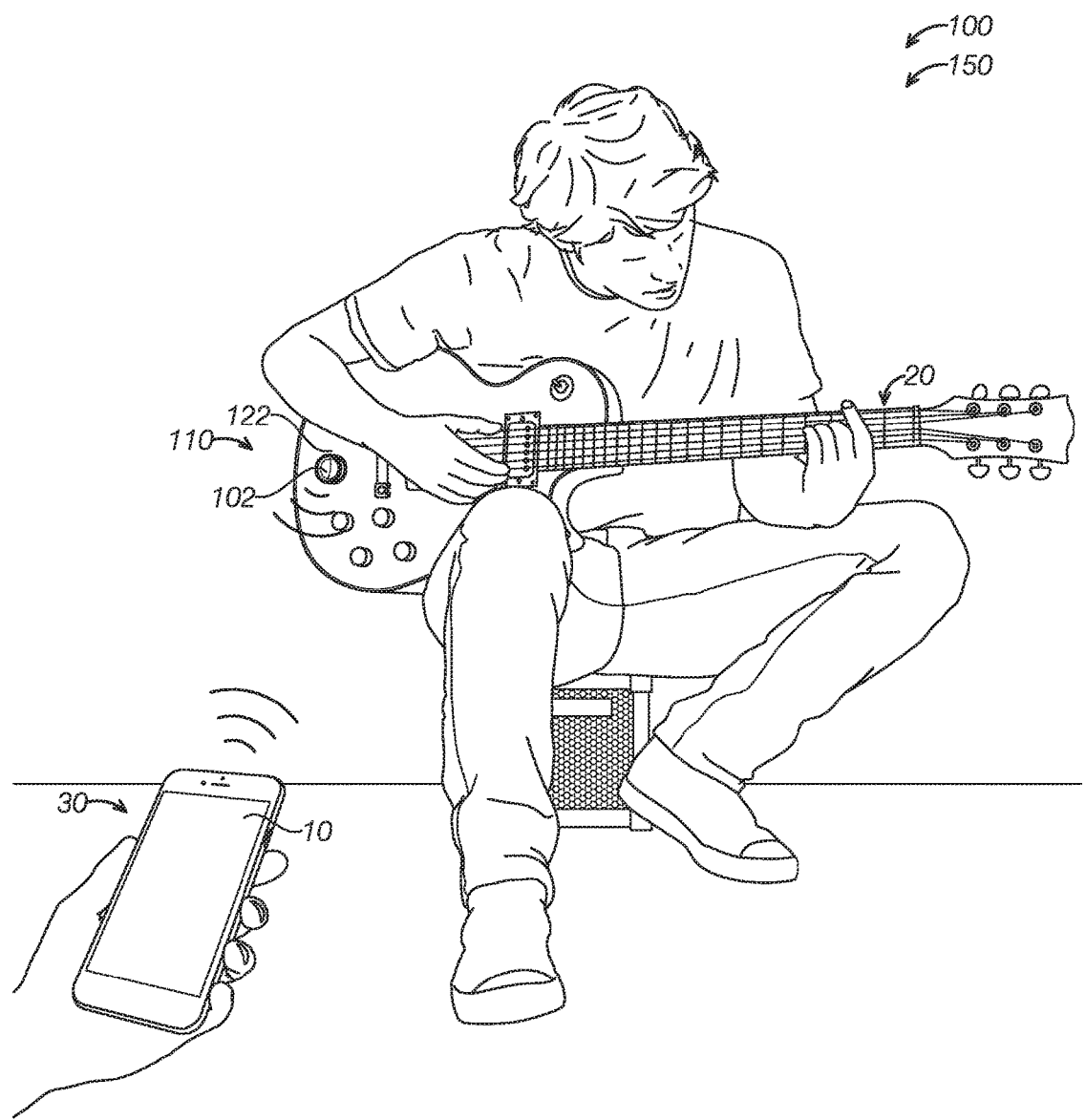
FIG. 1 is a perspective view of a first example of a musical instrument activity monitoring system in use with a musician playing a guitar and the device communicating with a cellular phone.

The disclosed musical instrument activity monitoring system will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various musical instrument activity monitoring systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The present invention may be used to monitor activity of a musical instrument. The device provides a seamless and automated way for a musician to track when and how long a musician plays his or her instrument, when and how long musicians play together as a group, and analyzes when an instrument supply item needs replacing based on playing and environmental factors.

The musical instrument activity monitoring system preferably comprises a small coin cell battery operated hardware device which may be placed on a surface of the instrument on an inside or outside surface. A musician may play his or her instrument 'as per usual' without any physical interaction with the device. The device automatically detects and tracks playing times and environment conditions, and stores a history of these values with timestamps on the device (or externally). By using a smartphone, PC or Internet gateway, a user may connect with the device using a wireless connection and upload the data. The smartphone, PC or server software may then analyze and display the history of play times to the user. By viewing the results from supply tracking, the user may gain insight as to when to replace a set of strings or bow for optimal sound quality for example. When configured to be used with a group, the server may associate individual musicians play time within the group, and the user may then also track and monitor the play times of the group as a single entity. The date, time and length of performances on a particular musical instrument are automatically detected.

A history of activity on each instrument may be available for analysis of trends, which may then be used by musicians to better understand, motivate and improve their skills. The data is made available to all the devices a user owns by using a replication service, adding to the convenience of viewing the data. Using the musical instrument activity monitoring system musicians with physical injuries and limitations may gauge how many minutes of play are sufficient and when they can increase that time. The device tracks when and how much a musician plays in diverse climatic conditions and the time the instrument is directly exposed to a given environment at the time when the musician is playing the instrument. Further, the device may track musical performances with multiple devices on various instruments in order to establish the playing times of a single musician and evaluate his or her performance trends on each of those individual instruments or as a whole The present invention may include features to automatically and manually tag music sessions, thereby keeping an account and correlation of the time that goes into individual types of musical performances, such as public shows, practice sessions, concerts and recording sessions. Music students and parents of child students may track practice times relevant to their music lessons. Music instructors may gain insight into their students' previous practice times before the start of a lesson and analyze trends throughout the course of the lessons.

Musical instrument activity monitoring system intelligently tracks musical accessories and supplies such as strings, plectrums and bows and allows users to understand how various factors affect supply lifespan. The user may be alerted when an accessory needs to be replaced based on factors such as playing time, playing style, and the environmental conditions that affect it. The device may track time musicians play together as an entity such as bands, ensembles, orchestras and group tuition and share that information between the musicians as well as those who within their group are not present at the time.

A microcontroller may be used with the present invention to periodically read data from an accelerometer. A microphone may be used in place of an accelerometer as the sensor to detect sound waves. In preferred embodiments an accelerometer is used because the power requirements are higher for a microphone but the fidelity of data from a microphone is better which could be used for other purposes in addition to play time detection. Thus, an existing device that has a microphone may be programmed to compute play time.

The data may be analyzed using a statistical and data mining algorithm to detect when and how long a musician played an instrument. False positives may be removed during this process, including scenarios such as driving, walking, flying, handling the instrument, and loud nearby music when the instrument is stationary. The time-stamped results are stored in non volatile memory on the device. The temperature and humidity data may also be periodically read and stored for supply tracking. When there is connectivity, data may be uploaded through a wireless protocol to a smartphone, a personal computer, or gateway to a back-end server. The recipient of the data also stores and merges the data from previous uploads. When a back-end server is present, the data may be replicated to multiple smartphones or personal computers owned by the user. The data and historical trends can be displayed on a screen to the user. Where applicable, a location history may be obtained from the smartphone and can be merged and correlated with the play time data to automatically assign location and session type tags to the sessions. Manually assigning tags is also an option.

Musical instrument supplies include strings, bows, plectrums and other items related to playing the instrument. The supply lifespan is related to the duration and manner of playing the instrument, and environment conditions such as winter vs summer seasons or when temperature and humidity levels are high vs low. The temperature data, humidity data, play time data, and features from analyzing the music performance, such as volume and statistical measures, are used as inputs to a data mining algorithm, typically running on a smartphone, personal computer or server. The algorithm 'learns' and refines estimates of the supply lifespan and suggests when to replace the supply. The musician may be a supervisory input to indicate when a supply is replaced. This input is used to provide feedback to the learning algorithm.

The tracking device may be placed on stringed instruments such as an acoustic guitar, electric guitar, violin, cello, piano, harp, wind instruments including a saxophone, trumpet, harmonica, percussion instruments such as drums, or any instrument that produces sound waves.

A smartphone may be used to gather location information and detect nearby devices configured to belong to a predefined group, such as a band or orchestra. Electronic devices used may comprise any suitable equivalent including smartphones, tablets, computers, and the like. These may comprise remote display means preferably comprising an app to view the tracking devices data. This data is stored and uploaded to the server and is used to correlate a musicians play times with the data from locally nearby devices, thereby tracking the times the group plays together as a single entity. At least one member of the group is required to have a smartphone present and a quorum of group members that are playing nearby around that time indicates the group as an entity is playing. In addition, when no smartphones are present to detect relevant nearby devices, the devices themselves can detect nearby relevant devices in a completely distributed and independent manner. The correlation to determine the group time is done when the data is finally uploaded to the server.

Automatic detection and tracking of when and how long an instrument is played, using a single autonomous device placed on the instrument or multiple instruments when multiple devices are utilized. No interaction by a user with the device is needed to create the history of play times. Only the one device located on a given instrument is needed to track and store the history. Play time data, environment conditions and music performance measures are used to learn, refine and estimate supply lifespan and suggest when to replace that supply item.

One tracking device is placed on one instrument. The tracking device tracks one instrument at a time but not multiple instruments simultaneously in preferred embodiments. The app which may run on the user's smartphone, personal computer or tablet may gather data from multiple tracking devices that the user owns, providing a central place to view tracking information for the multiple instruments owned by a user.

For group tracking, it is assumed that each member's instrument has a tracking device. A single tracking device tracks and stores play time information for the one instrument and may also detect the presence of nearby group members, but not the nearby members playing time. Presence information can also be obtained from a user's smartphone instead of the tracking device. The data from the multiple tracking devices of the group is then uploaded to a server. The play times and nearby member presence information from each tracking device is used by the server to correlate and determine the group play times. Thus, a single tracking device cannot strictly determine the group play time by itself, this is where the server uses the data from multiple devices.

In another embodiment, one tracking device uses the presence information found to tag a single users' session as playing in a group. This does not require a server to compute the tagging, and thus is a local or decentralized variation. The latter would be smaller in duration than the group play time determined by the server since it is possible that a song played by the group won't start and end with all members playing at the same time. The server is also a central store for the group play times so that anyone can view the group play times, whereas the local session tagging approach is only known locally to that single user.

Additionally, the invention detects when nearby relevant devices are present in order to determine when and how long the group as an entity was playing. Digital input may be included with the device and the play times of electronic instruments may be tracked. A wireless internet capable device may be used or in other embodiments BLUETOOTH® low energy may be used for the wireless connection.

With reference to FIGS. 1-4B, a first example of a musical instrument activity monitoring system, musical instrument activity monitoring system 100, will now be described. musical instrument activity monitoring system 100 functions to provide a musical instrument monitoring device 102. The reader will appreciate from the figures and description below that musical instrument activity monitoring system 100 addresses shortcomings of conventional monitoring devices.

Figure 5:
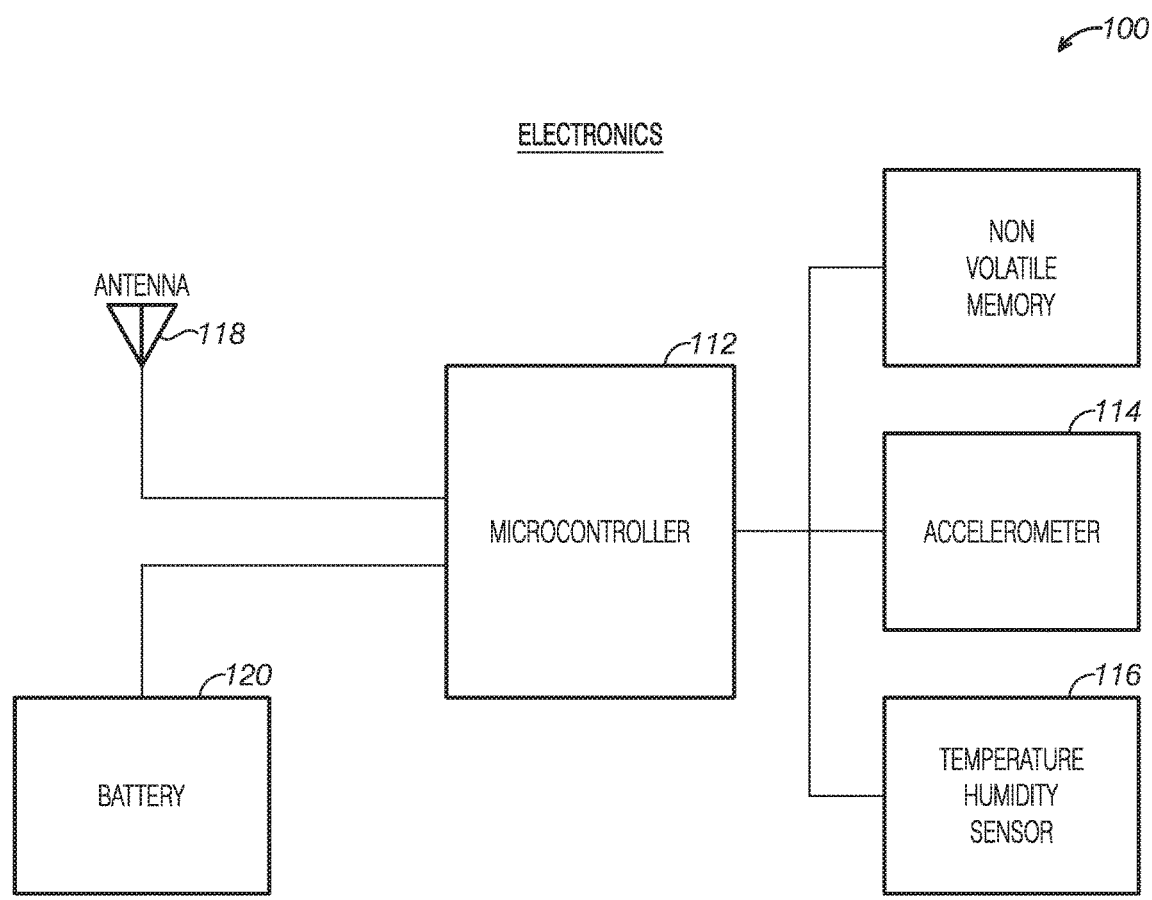
FIG. 5 is a flowchart showing communications of components within the musical instrument activity monitoring system.

In a preferred embodiment, musical instrument activity monitoring system 100, comprises a tracking and monitoring assembly 110 including a microcontroller 112 with non-volatile memory, an accelerometer 114 in communication with the microcontroller 112, at least one sensor 116 in communication with the microcontroller 112, an antenna 118 in communication with the microcontroller 112, and a power source 120, and a coupler 122 (coupling means). FIG. 1 is a perspective view of a first example of a musical instrument activity monitoring system 100 in an in-use condition 150 with a musician playing a guitar and the device communicating with a cellular phone 10. FIG. 5 shows a flowchart showing communications of the various components within the musical instrument activity monitoring system 100.

In-use parameters of musical instrument activity is tracked and monitored by the tracking and monitoring assembly 110. The tracking and monitoring assembly may comprise in functional combination the microcontroller 112 with non-volatile memory in communication with the accelerometer 114, the at least one sensor 116, the antenna 118; the tracking and monitoring assembly 110 powered by the power source 120. The accelerometer 114 is configured to detect sound waves emitting from a sound source being at least one musical instrument 20, examples shown in FIGS. 2A-3. Other instruments may be monitored via the musical instrument activity monitoring system 100. The at least one sensor 116 senses the musical instrument activity, as indicated in FIGS. 1 and 3. The antenna 118 is configured to relay data from the microcontroller 112. The coupler 122 is used to couple the tracking and monitoring assembly 110 to the at least one musical instrument 20. Coupler 122 may comprise adhesive or mechanical means or other suitable means for coupling the tracking and monitoring assembly 110 to the at least one musical instrument 20.

Figure 4A:
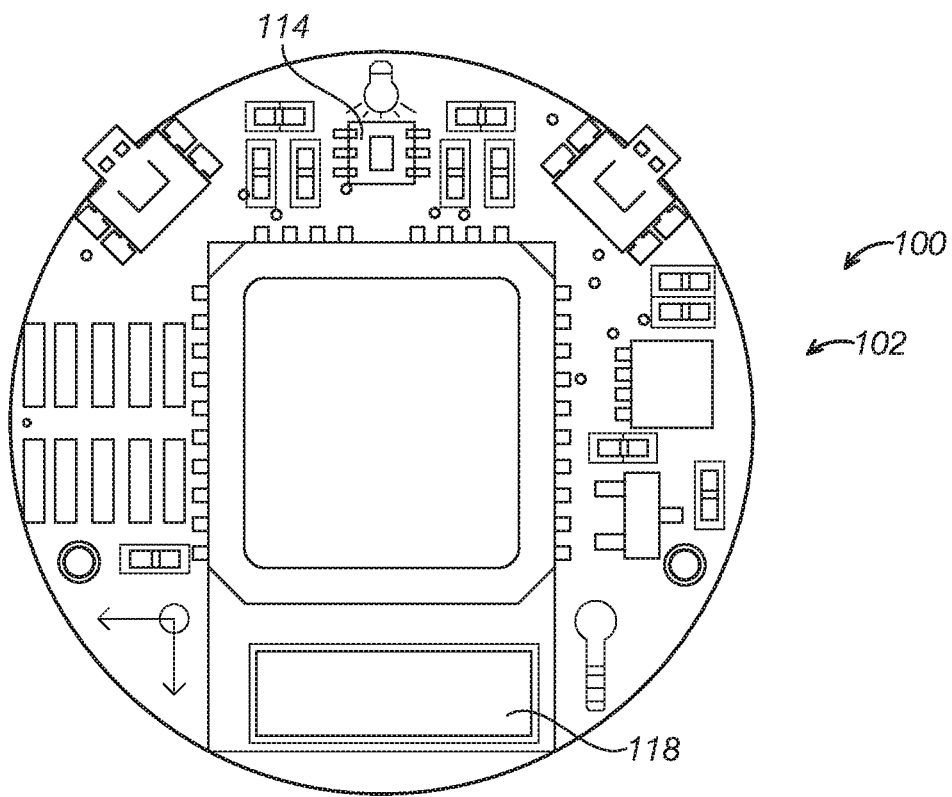
FIG. 4A is a perspective view of a microchip as used in the musical instrument activity monitoring system.
Figure 4B:
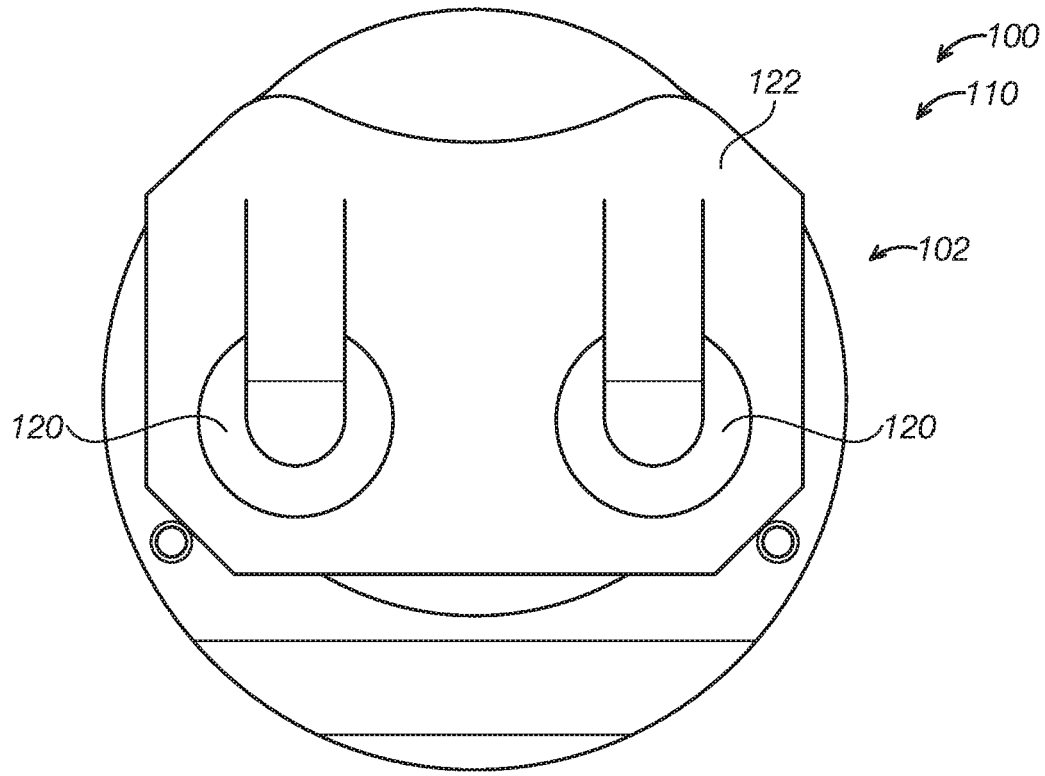
FIG. 4B is a perspective view of a microchip as used in the musical instrument activity monitoring system.

The microcontroller 112 with non-volatile memory stores the data. The data relates to values and timestamps, as previously mentioned, retrieved from use of the at least one musical instrument 20 and environmental conditions the at least one musical instrument 20 is in to analyze performance of the at least one musical instrument 20 over a duration. The data is transmittable to a remote displayer through a wireless protocol; the remote displayer may comprise a smartphone such as cellular phone 10, as shown in FIG. 1. The data may be transmittable by a user to the remote displayer via wireless internet. The at least one sensor 116 may comprise a temperature humidity sensor. FIG. 4A is a perspective view of the microchip (microcontroller 112) as used in the musical instrument activity monitoring system 100.

For example, musical instrument activity monitoring system 100 addresses the need to track playing of instrument 20. Further, musical instrument activity monitoring system 100 addresses the need to monitor the instrument through a duration such that longevity of the instrument 20 is maximized.

Figure 2A:
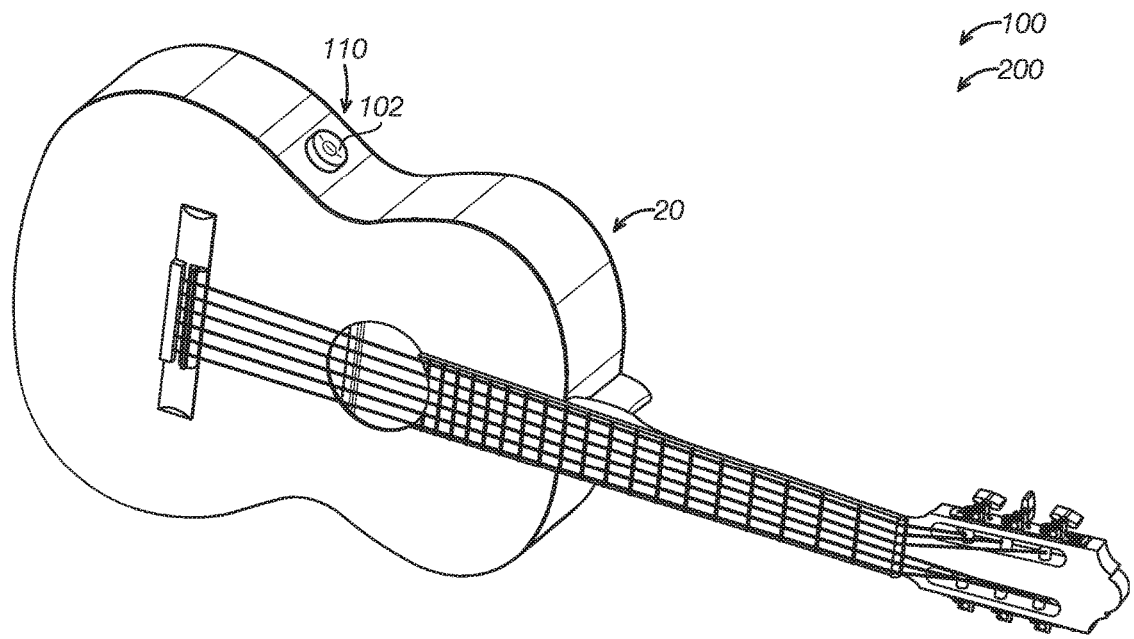
FIG. 2A is a perspective view of the musical instrument activity monitoring system shown in FIG. 1 depicting use with a guitar with the device mounted thereon.
Figure 3:
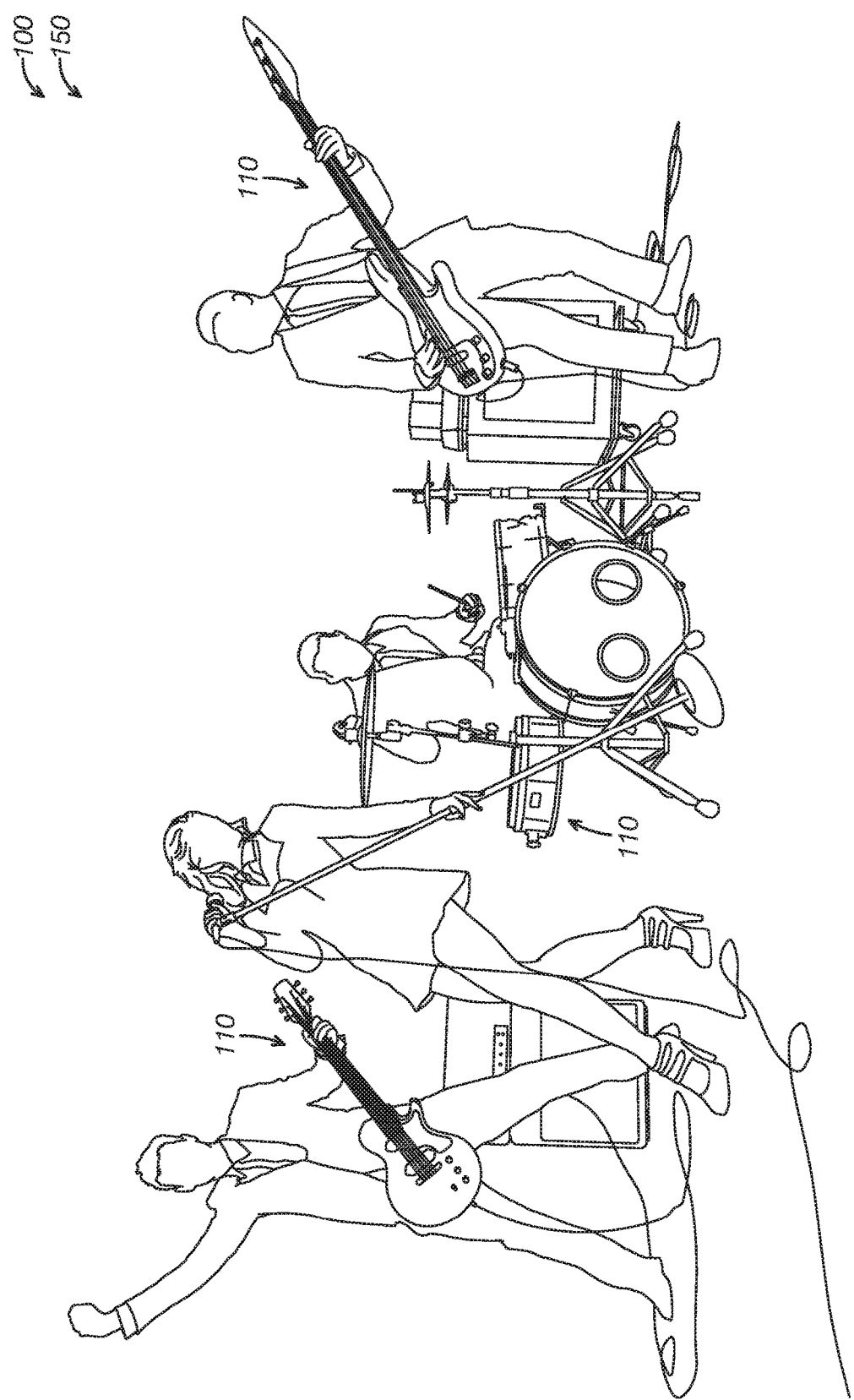
FIG. 3 is a perspective view of a second example of a musical instrument activity monitoring system as used with a plurality of instruments in a band setting.

Turning attention to FIG. 2A, a second example of a musical instrument activity monitoring system, musical instrument activity monitoring system 200, will now be described. Musical instrument activity monitoring system 200 includes many similar or identical features to musical instrument activity monitoring system 100. Thus, for the sake of brevity, each feature of musical instrument activity monitoring system 200 will not be redundantly explained. Rather, key distinctions between musical instrument activity monitoring system 200 and musical instrument activity monitoring system 100 will be described in detail and the reader should reference the discussion above for features substantially similar between the two musical instrument activity monitoring systems 100 and 200, respectively. Various instruments may be used in conjunction with the present invention as well as various coupling means.

The data is transmittable to a remote displayer through a wireless protocol; the remote displayer may comprise a personal computer, whereas musical instrument activity monitoring system 100 may find use with cellular phone 10, as shown in FIG. 1. The timestamps may in both embodiments 100 and 200 be used to create a history available to be viewed and tracked on at least one electronic device 30 via the remote displayer. The tracking and monitoring assembly 110 tracks and monitors play times of a single musician, and the monitoring assembly 110 or cellular phone 10 tracks the presence of nearby assemblies to facilitate tracking the play times of a group of musicians as a single entity. (A single tracking device (assembly 110) tracks the play times of a single musician or instrument but not the play times of other group members. The sensor on the device can only detect sound waves on the instrument on which it is attached, not the other group members instruments that it's not attached to. However, the device (and/or phone) can use its wireless network to detect the presence of nearby group members' instruments. Thus, a tracking device and/or phone facilitates tracking of groups by detecting, storing and uploading the presence information about nearby group members that it sensed using its wireless network. Together with the server back-end, the system 100 can then detect play times of a group of musicians.)

Figure 2B:
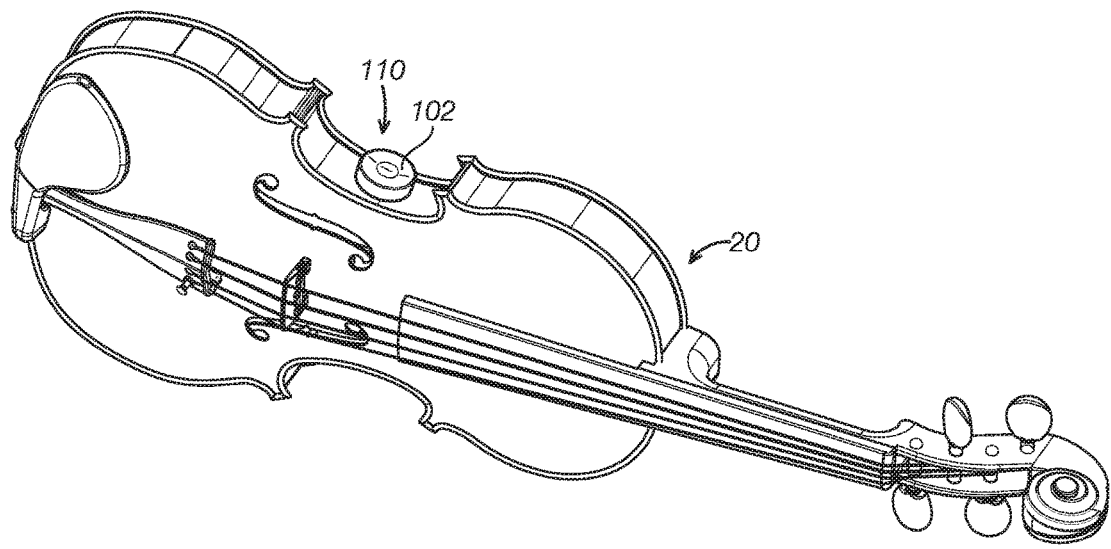
FIG. 2B is another perspective view of the musical instrument activity monitoring system shown in FIG. 1 depicting use with a violin with the device mounted thereon.

The tracking and monitoring assembly 110 analyzes when a supply item of the at least one musical instrument 20 needs to be replaced based on use of the at least one musical instrument 20 and the environmental conditions tracked. The tracking and monitoring assembly 110 analyzes trends of play times of a single musician. The tracking and monitoring assembly 110 analyzes a plurality of the at least one musical instruments 20 played by a single musician. The data is analyzed using a statistical and data mining algorithm to detect when and how long the at least one musician played the at least one musical instrument 20 removing false positives during this process for accurate results. The location history may be obtained from the remote displayer comprising a smartphone (cellular phone 10) or computer or the like and merged and correlated with the play time the data to automatically assign location and session type tags to sessions. The data is available and viewable on multiple remote displaying means. The at least one musical instrument 20 may comprise a stringed-instrument, as shown in FIG. 1-2B, or a percussion-instrument, or wind-instrument, or any instrument that emits sound waves. A digital input may be used when the instrument does not emit a sound wave.

Figure 6:
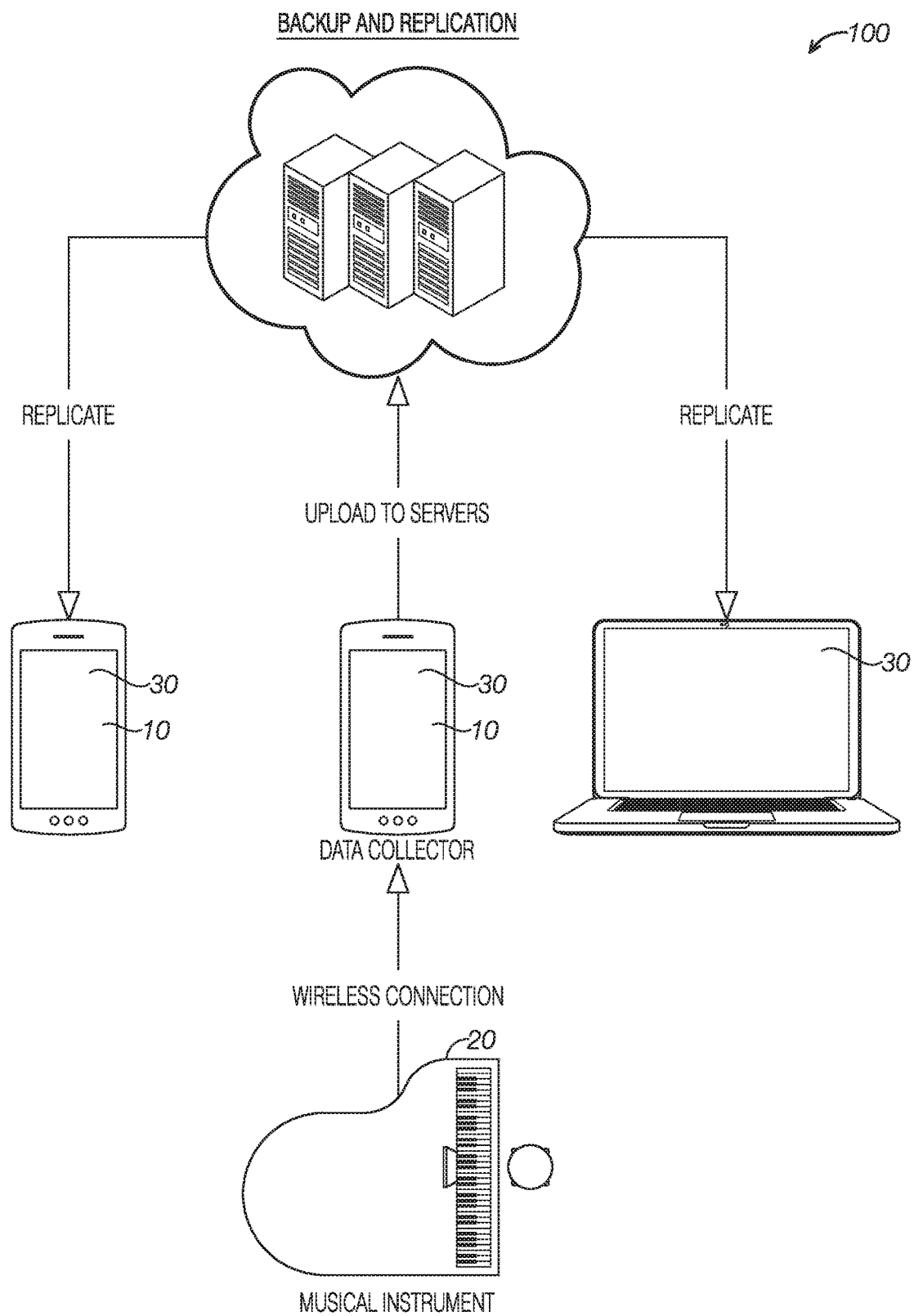
FIG. 6 is a flowchart showing backup and replication from communications of components within the musical instrument activity monitoring system.
Figure 7:
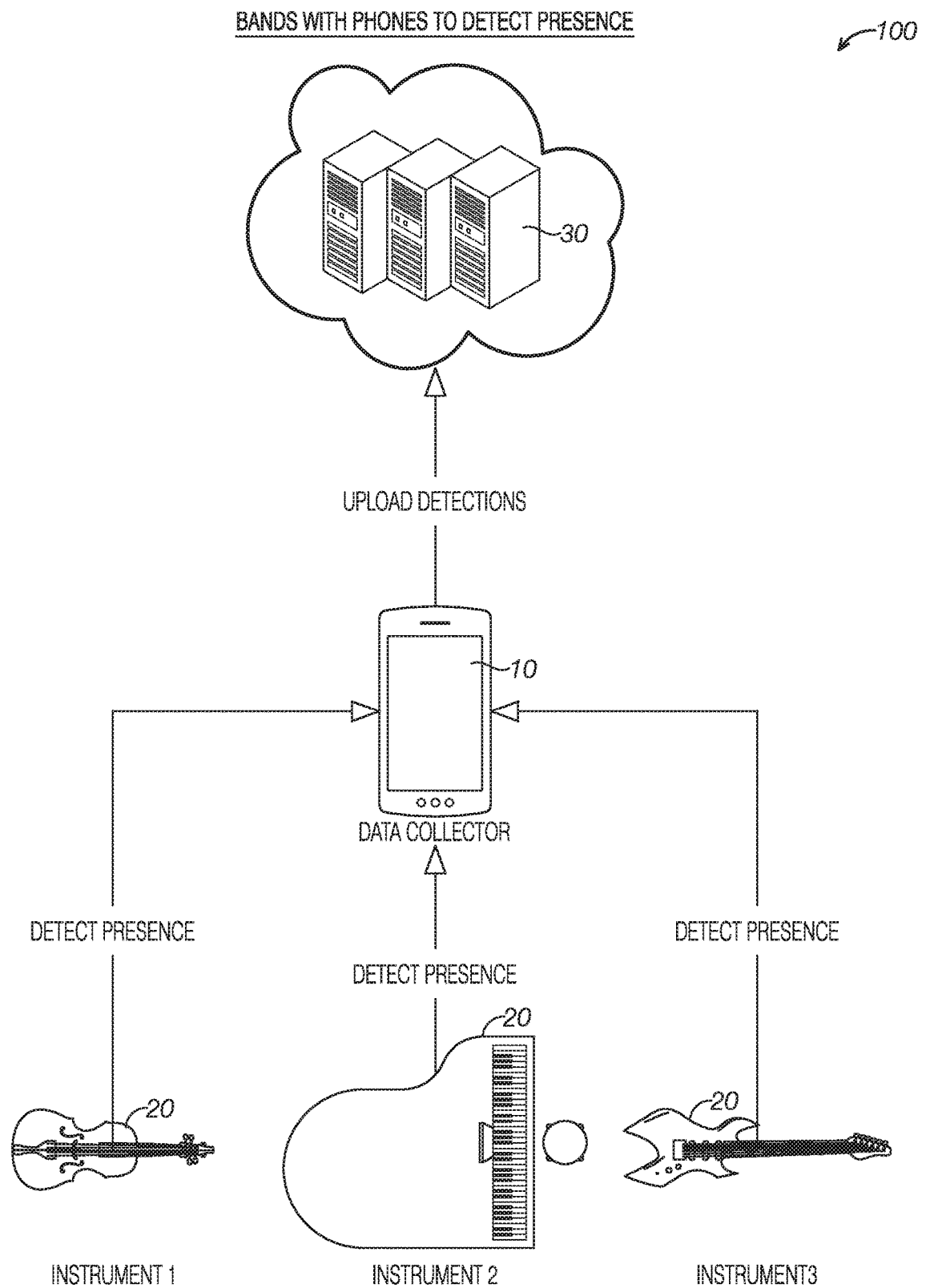
FIG. 7 is a flowchart showing a cellular phone detecting the presence of musical instruments within the musical instrument activity monitoring system.
Figure 8:
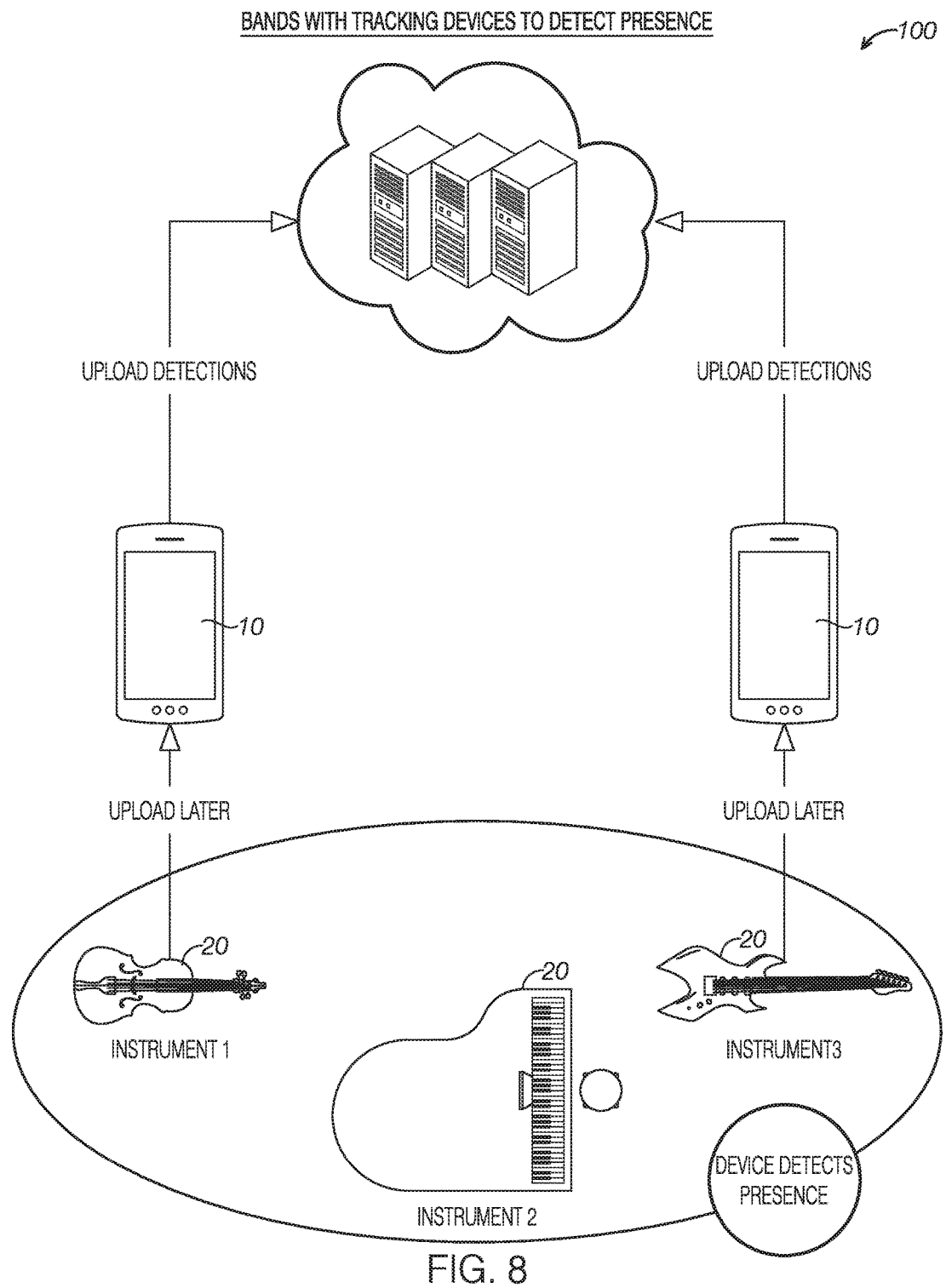
FIG. 8 is a flowchart showing tracking devices detecting the presence of musical instruments within the musical instrument activity monitoring system.

FIGS. 6-8 show various flowcharts showing respectively, backup and replication, a cellular phone 10 and monitoring assembly 110 detecting the presence of musical instruments 20 within the musical instrument activity monitoring system 100.

A method of using musical instrument activity monitoring system will now be described. The method includes placing a tracking and monitoring assembly 110 on at least one musical instrument 20, playing at least one musical instrument 20, recording and analyzing data and playtime of at least one musician, and reviewing the data on a display screen of an electronic device 30.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A musical instrument activity monitoring system, comprising:
   a tracking and monitoring assembly including;
   a microcontroller with non-volatile memory;
   an accelerometer in communication with said microcontroller;
   at least one sensor in communication with said microcontroller;
   an antenna in communication with said microcontroller; and
   a power source; and
   a coupler;
   wherein in-use parameters of musical instrument activity is tracked and monitored by said tracking and monitoring assembly;
   wherein said tracking and monitoring assembly comprises in functional combination said microcontroller with non-volatile memory in communication with said accelerometer, said at least one sensor, said antenna, said tracking and monitoring assembly powered by said power source;
   wherein said accelerometer is configured to detect sound waves emitting from a sound source being at least one musical instrument;
   wherein said at least one sensor senses said musical instrument activity;
   wherein said antenna is configured to relay data from said microcontroller;
   wherein said coupler is used to couple said tracking and monitoring assembly to said at least one musical instrument;
   wherein said microcontroller with non-volatile memory stores said data;
   wherein said data relates to values and timestamps retrieved from use of said at least one musical instrument and environmental conditions said at least one musical instrument is in to analyze performance of said at least one musical instrument.

2. The musical instrument activity monitoring system of claim 1, wherein said at least one sensor comprises a temperature humidity sensor.

3. The musical instrument activity monitoring system of claim 2, wherein said data is transmittable to a remote displayer through a wireless protocol, said remote displayer comprising a smartphone.

4. The musical instrument activity monitoring system of claim 2, wherein said data is transmittable to a remote displayer through a wireless protocol, said remote displayer comprising a personal computer.

5. The musical instrument activity monitoring system of claim 3, wherein said timestamps are used to create a history available to be viewed and tracked on at least one electronic device via said remote displayer.

6. The musical instrument activity monitoring system of claim 2, wherein said tracking and monitoring assembly tracks and monitors play times of a group of musicians.

7. The musical instrument activity monitoring system of claim 2, wherein said tracking and monitoring assembly tracks and monitors play times of a single musician.

8. The musical instrument activity monitoring system of claim 5, wherein said data is transmittable by a user to said remote displayer via wireless internet.

9. The musical instrument activity monitoring system of claim 1, wherein said tracking and monitoring assembly analyzes when a supply item of said at least one musical instrument needs to be replaced based on use of said at least one musical instrument and said environmental conditions tracked.

10. A musical instrument activity monitoring system, comprising:
    a tracking and monitoring assembly including;
    a microcontroller with non-volatile memory;
    an accelerometer in communication with said microcontroller;
    at least one sensor in communication with said microcontroller;

an antenna in communication with said microcontroller; and a power source; and a coupler;

wherein in-use parameters of at least one musical instrument activity is tracked and monitored by said tracking and monitoring assembly;

wherein said tracking and monitoring assembly comprises in functional combination said microcontroller with non-volatile memory in communication with said accelerometer, said at least one sensor, said antenna, said tracking and monitoring assembly powered by said power source;

wherein said accelerometer is configured to detect sound waves emitting from at least one sound source being at least one musical instrument;

wherein said at least one sensor senses said at least one musical instrument activity;

wherein said antenna is configured to relay data from said microcontroller;

wherein said coupler is used to removably couple said tracking and monitoring assembly to said at least one musical instrument;

wherein said microcontroller with non-volatile memory stores said data;

wherein said data is transmittable to a remote displayer through a wireless protocol, said remote displayer comprising an electronic device; and wherein said data relates to values and timestamps retrieved from use of said at least one musical instrument and environmental conditions said at least one musical instrument is in to analyze performance of said at least one musical instrument.

11. The musical instrument activity monitoring system of claim 10, wherein said tracking and monitoring assembly analyzes trends of play times of a single musician.

12. The musical instrument activity monitoring system of claim 10, wherein said tracking and monitoring assembly analyzes a plurality of said at least one musical instruments played by a single musician.

13. The musical instrument activity monitoring system of claim 10, wherein said data is analyzed using a statistical and data mining algorithm to detect when and how long said at least one musician played said at least one musical instrument removing false positives during this process for accurate results.

14. The musical instrument activity monitoring system of claim 10, wherein said location history is obtained from said remote displayer comprising a smartphone and merged and correlated with said play time said data to automatically assign location and session type tags to sessions.

15. The musical instrument activity monitoring system of claim 10, wherein said data is available and viewable on multiple remote displaying means.

16. The musical instrument activity monitoring system of claim 10, wherein said at least one musical instrument comprises a stringed-instrument.

17. The musical instrument activity monitoring system of claim 10, wherein said at least one musical instrument comprises a percussion-instrument.

* * * * *